Aug. 18, 1925.
H. L. LITCHFIELD
3-HORSE EVENER
Filed Feb. 7, 1923
1,550,083
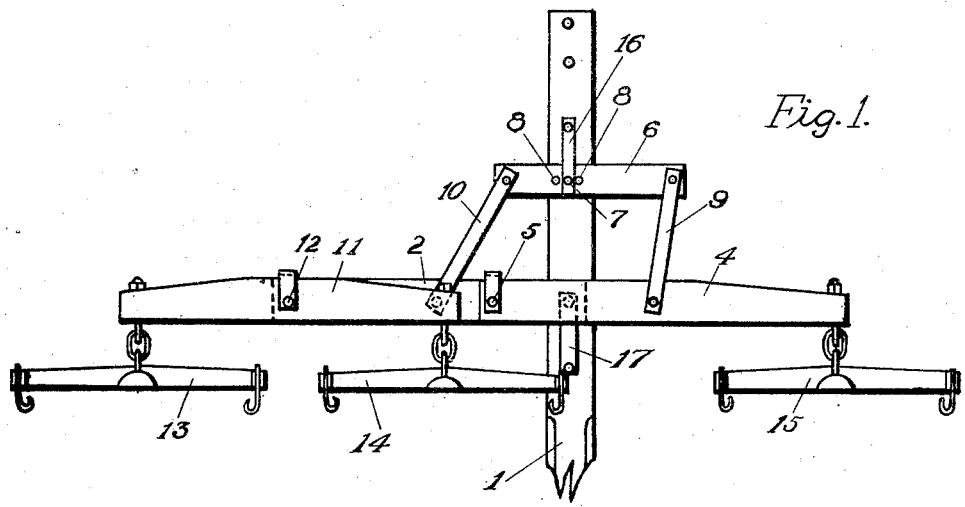
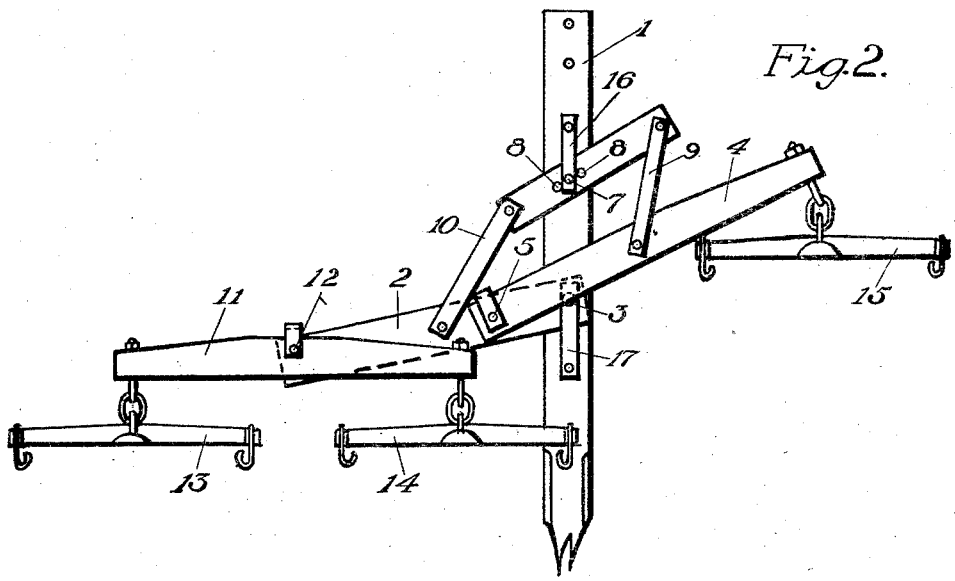
INVENTOR
Henry L. Litchfield
BY
ATTORNEY Patented Aug. 18, 1925.

1,550,083

UNITED STATES PATENT OFFICE.

HENRY L. LITCHFIELD, OF WATERLOO, IOWA.

THREE-HORSE EVENER.

Application filed February 7, 1923. Serial No. 617,433.

*To all whom it may concern:*

Be it known that I, HENRY L. LITCHFIELD, a citizen of the United States, residing at Waterloo, county of Blackhawk, State of Iowa, have invented a certain new and useful Improvement in Three-Horse Eveners, and declare the following to be a full, clear, and exact description of the same, such as will enable others skilled in the art to which it pertains to make and use the same, reference being had to the accompanying drawing, which forms a part of this specification.

The object of the present invention is to produce a simple and novel apparatus for hitching three horses to the pole of a vehicle in such a manner that the distribution of the load between the three horses is at all times equalized, regardless of whether the horses are walking abreast of each other, or whether the one horse or group of horses is lagging behind.

A further object of the present invention is to produce a simple and novel means for attaching three horses to a vehicle pole in such a manner that the middle horse may be brought closer to the pole than has heretofore been thought possible, and thus reduce the side draft on the pole to a minimum.

A further object of the present invention is to produce a simple and novel 3-horse evener in which all of the singletrees may lie in the same vertical and horizontal planes.

A further object of the present invention is to produce a simple, novel and efficient 3-horse evener which may quickly and easily be adjusted to vary the proportions of the load imposed on the single horse and the group of two horses, respectively.

Generally stated, the present invention may be said to have for its object to produce a 3-horse evener which shall be simple in construction and efficient in operation under all of the conditions encountered in actual practice.

The various features of novelty whereby my invention is characterized will hereinafter be pointed out with particularity in the claims; but for a full understanding of my invention and of its objects and advantages reference may be had to the following detailed description taken in connection with the accompanying drawing, wherein:

Figure 1 is a plan view of the rear end of a vehicle draft pole having line-proof evener applied thereto; and Fig. 2 is a view similar to Fig. 1, showing the parts in different positions from those occupied in Fig. 1.

Referring to the drawing, 1 represents a wagon pole to which is pivotally connected one end of a bar 2, as indicated at 3; this bar projecting laterally from the pole, and its pivotal connection being such that it may swing in a horizontal plane. A second bar 4 longer than the bar 2 is pivotally connected at one end to the latter bar, as indicated at 5, at a point removed a considerable distance from the pivotal axis of the bar 2; so that when both of the bars, 2 and 4, are arranged at right angles to the pole, as indicated in Fig. 1, one end of the bar 4 of about the same length as the bar 2 overlies the inner end of the bar 2 on the opposite side of the pole from that on which the main portion of the bar 4 lies. Behind the bars 2 and 4 is placed an equalizing bar 6 which extends across the pole and is attached thereto by means of a pivot pin 7 extending through the bar 6 between the ends thereof. The equalizing bar may be provided with a plurality of holes 8 distributed lengthwise thereof, any one of the holes being adapted to receive the pivot pin, thus permitting the relative lengths of the two arms of the equalizer bar to be varied. The pivot pin divides the equalizer bar into arms of unequal lengths, regardless of the hole through which the pivot pin extends, so as to permit a long arm to project laterally from the pole on the same side as the bar 4, while a shorter arm lies on the opposite side of the pole, namely, on the side of the bar 2. The free end of the long arm of the equalizing lever is connected to the bar 4 by means of a link 9. Similarly, a link 10 connects the free end of the shorter arm of the equalizer bar to the bar 2 at a point beyond the inner end of the bar 4. It will therefore be seen that a pull on the free end of either of the bars 2 and 4 will be effective only when there is also a pull exerted on the free end of the other bar.

Overlying the free end of the bar 2 is a doubletree 11 pivotally connected at the middle, as indicated at 12. Singletrees 13 and 14 are attached to the ends of the doubletree, while a third singletree 15 is connected to the free end of the bar 4. Since the doubletree and the bar 4 lie in the same horizontal plane and, when the bars are in the positions illustrated in Fig. 1, lie also in the same vertical plane, it will be seen that all three of the singletrees may be aligned end to end.

A reinforcing strap 16 is carried rearwardly from the pivot pin 7, while a similar strap 17 is carried forwardly along the pole from the pivot pin 3 which fastens the bar 2 to the pole; the forces in the direction of the length of the pole being opposite to each other at these two points of connection of the draft equalizing means with the pole.

It will thus be seen that I have produced a simple and novel construction and arrangement which permits all of the singletrees to lie in alignment with each other so as to bring the draft animals abreast of each other; which permits a considerable relative displacement of the third horse singletree and the doubletree, so as to provide flexibility or unevenness of the pull on sharp turns without decreasing to any considerable extent the advantage of the third horse. It will also be seen that the distance between the pivot 12 of the doubletree and the pole does not vary to any considerable extent throughout the limits of movement of the supporting bar 2. Therefore the middle horse may initially be placed close to the pole and will remain there, thus reducing the side draft on the pole to a minimum. It will also be seen that by simply shifting the pivot pin of the equalizer bar from one hole to another, an adjustment is secured to adapt the apparatus to various relations between the strength of the single horse on one side and of the two horses on the other side.

While I have illustrated and described with particularity only a single preferred form of my invention, I do not desire to be limited to the exact structural details thus illustrated and described, but intend to cover all forms and arrangements which come within the terms employed in the definitions of my invention constituting the appended claims.

I claim:

1. The combination with the draft pole of a vehicle, of a bar pivoted at one end to said pole and projecting laterally therefrom, a second bar pivoted at one end to the first bar at a point lying on one side of the pole and projecting across the pole to the opposite side thereof for a distance approximately equal to the length of the first bar, a doubletree connected to the free end of the first bar, a singletree connected to the free end of the second bar, an equalizing bar pivoted directly to the pole between its ends so as to be divided into arms of unequal length, and a connection between each end of said equalizing bar and one of the other bars.

2. The combination with the draft pole of a vehicle, of a bar pivoted at one end to the pole and projecting laterally therefrom, a second bar pivoted at one end to the first bar on one side of the pole and projecting across the pole to the opposite side, an equalizing bar, a connection between each end of the equalizing bar and one of the other bars, means for adjustably pivoting the equalizing bar directly to the pole so as to permit the relative lengths of its lever arms to be varied, a doubletree connected to the free end of the first bar, and a singletree connected to the free end of the second bar.

In testimony whereof I sign this specification.

HENRY L. LITCHFIELD